United States Patent Office 3,689,445
Patented Sept. 5, 1972

3,689,445
THICKENED AQUEOUS LATICES
John Joseph Hopwood, Glen Waverley, Victoria, Robert William Kershaw, South Blackburn, Victoria, and Frederick John Lubbock, Beaumaris, Victoria, Australia, assignors to Balm Paints Limited, Melbourne, Victoria, Australia
No Drawing. Filed Dec. 16, 1968, Ser. No. 784,197
Claims priority, application Australia, Dec. 28, 1967, 31,725/67
Int. Cl. C09d 3/00
U.S. Cl. 260—29.6
7 Claims

ABSTRACT OF THE DISCLOSURE

Thickened aqueous latices of 0.4 to 2.0 micon average disperse polymer particle diameter and comprising 0.1 to 10.0% by weight of the polymer particles of a polymeric thickener of molecular weight 10,000 to 300,000 are disclosed. The thickener consists of a chain-like copolymer of vinyl alcohol and at least one co-monomer containing 4 to 18 carbon atoms whereof a homopolymer is insoluble in the aqueous liquid and in which the proportion of co-monomer bears a specific relationship to the number of carbon atoms it contains. In a particular embodiment a process is provided of preparing thickened aqueous latices with a flow coefficient of greater than 1.5.

---

This invention relates to tickened aqueous latices and to polymeric thickener compositions for use therein.

By an aqueous latex we mean a stable dispersion in an aqueous liquid of polymeric particles which are insoluble in the liquid.

It is known to increase the viscosity of such a latex by adding to it a thickener, for example a water-soluble salt or ether of cellulose, an ammonium salt of poly(acrylic acid) or poly(vinyl pyrrolidone) at a concentration of, e.g. 0.2% to 20% by weight.

It does not necessarily follow, however, that any polymeric material which forms a viscous solution in water is necessarily a desirable thickener in an aqueous latex. For example two polymeric materials may produce solutions of similar viscosities at the same weight concentration in water, but when added at equal concentrations to samples of a commercial aqueous latex, one may produce a significant increase in the viscosity of the latex while the other has a relatively small effect on the viscosity. By increasing the weight concentration of the "weaker" thickener it may be possible to match the viscosity of the sample thickened with the "stronger" thickener but for certain applications and particularly in surface coating materials where it is desirable to keep the concentration of water-soluble materials in the latex to a minimum, this is an unsatisfactory alternative.

We have now found that certain copolymers of vinyl alcohol when used in the manner described hereinunder provide thickened aqueous latices of value in, for example, latex paints.

According to the present invention we provide a thickened aqueous latex comprising an aqueous latex containing from 20% to 60% by weight of disperse polymer particles having an average diameter of 0.04 to 2.0 micron, preferably 0.1 to 0.6 micron, and a polymeric thickener at a weight concentration of 0.1% to 10.0%, preferably 1.0% to 5.0%, of the weight of disperse polymer and soluble in the aqueous latex the said thickener consisting of a chain-like copolymer of vinyl alcohol with at least one co-monomer containing 4 to 18 carbon atoms and selected from the group consisting of olefins, aromatic substituted olefins, alkyl esters of α,β-ethylenically unsaturated mono- and di-carboxylic acids and saturated tertiary acid esters of vinyl alcohol whereof a homopolymer is essentially insoluble in the aqueous latex, the copolymer having a weight average molecular weight of 10,000 to 300,000 and the proportion of co-monomer units therein being related to the number of carbon atoms in the co-monomer according to the following table:

| C. atoms in co-monomer | Mols of co-monomer units as a percentage of total monomer units | | |
|---|---|---|---|
| | Minimum | Maximum | Preferred range |
| 4 | 10.0 | 50 | 15–30 |
| 5 | 6.0 | 30 | 8–20 |
| 6 | 3.0 | 20 | 5–10 |
| 7 | 1.5 | 16 | 2–8 |
| 8 | 1.0 | 13 | 1.5–7 |
| 9 | 0.8 | 11 | 1.2–6 |
| 10 | 0.7 | 10 | 1.0–5 |
| 11 | 0.6 | 9 | 0.9–4 |
| 12 | 0.5 | 8 | 0.8–4 |
| 13–18 | 0.2 | 6 | 0.3–3 |

The composition of the resinous particles of the aqueous latex is not critical and we have found that our invention is applicable to all of the polymers or copolymers commonly used in latex paints. Such polymers are for example homopolymers or copolymers of the following classes of monomers:

vinyl esters and ethers, alkyl acrylates and methacrylates, alkyl fumarates and maleates, halogenated vinyls, aryl vinyls and olefins.

For example suitable monomers are vinyl acetate, vinyl propionate, vinyl caproate, vinyl stearate, vinyl esters of saturated tertiary mono-carboxylic acids, vinyl siloxanes, and the saturated monohydric alcohol esters of acrylic acid, methacrylic acid, maleic acid and fumaric acid including those derived from methanol, ethanol, n-propanol, isopropanol n-butanol, isobutanol, secondary butanol, tertiary butanol, cyclohexanol, 2 ethyl-hexanol, dodecanol, hexadecanol, and octadecanol. Other suitable monomers include vinyl chloride, vinylidene chloride, vinylidene fluoride, styrene, α-methyl styrene, the commercial mixed isomers known as "vinyl toluene," ethylene, propylene, iso-butylene.

The polymers may be copolymers of two or more of the above monomers and particularly useful compositions are copolymers of vinyl acetate in the major molar proportion with vinyl caproate, 2-ethyl hexyl acrylate, ethyl acrylate, n-butyl methacrylate, di-butyl maleate, or di-butyl fumarate in the minor molar proportion, or copolymers of methyl methacrylate with ethyl acrylate, butyl acrylate, butyl methacrylate, or 2-ethyl hexyl acrylate. It is known that minor (usually less than 3% by weight of the polymer) proportions of other monomers, e.g. the unsaturated acids of the above esters, are sometimes used to modify the said copolymers and we comprehend such modifications in our definition of suitable copolymers. Alternatively, the resinous particles may be essentially linear polymers or copolymers of isoprene, chloroprene and butadiene.

Although the invention is applicable to latices in which the disperse particles have an average diameter of from 0.04 to 2.0 micron, the best results are achieved when the maximum average diameter of the particles does not exceed 0.6 micron, Also, bearing in mind the desirability of providing thickened latices of good long-term stability, we prefer to limit the diameter of the particles to a minimum of 0.1 micron.

The aqueous liquid provides the continuous phase of the latex and it may comprise water alone or water to which has been added up to 40% by weight of water-soluble or water-miscible organic liquids, for example to increase the solubility of the liquid for the thickener, to control the evaporative characteristics of the continuous phase or the freeze-thaw stability or coalescing properties of the latex. The organic liquids may be present alone or in combination.

The organic liquids may be, for example, alkyl alcohols, alkylene glycols, alkyl glycol ether alcohols, alkyl ketones and some alkyl ethers. We have found ethyl alcohol, propyl alcohol, ethylene glycol, propylene glycols, butylene glycols, hexylene glycols, diethylene glycol, 2-methoxy ethanol, 2-ethoxy ethanol, 2-propoxy ethanol, 2-butoxy ethanol, diethylene glycol mono-propyl ether, diacetone alcohol, and dioxane to be satisfactory liquids.

The preferred organic liquids are ethylene glycol, propylene glycols, butylene glycols, 2-ethoxy ethanol, 2-butoxy ethanol and diacetone alcohol.

The continuous phase may also comprise surface-active agents which are commonly encountered in latex-based compositions. Such agents are, for example, components utilised in manufacturing the latex or introduced into the composition for example to stabilise dispersed pigment or polymer particles or especially when the composition is a latex paint, agents to assist the paint to "wet" greasy surfaces. A wide variety of surface-active agents, including both ionic and non-ionic types, either singly or in combination, are in common use for such purposes, but we limit their total concentration to a maximum of 4% by weight of the unthickened latex.

Typical surface-active agents are, for example, complex phosphates, e.g. sodium hexametaphosphate, naphthalene sulphonates, alkyl aryl poly(oxyethylene) sulphates, di-alkyl sulphosuccinate, trialkyl ammonium base, poly(oxyethylene) ethanol fatty acid esters, alkyl (oxyethoxy) amide, alkyl aryl poly(oxyethylene) alcohol and random or block copolymers of ethylene and propylene oxide.

Especially when it is a latex paint, the thickened latex may contain other materials, for example pigments, fillers, preservatives, defoamers and plasticisers. Such additional materials are comprehended within our definition of a thickened aqueous latex. They are usually added to the latex before thickening.

It will, of course, be understood that the latex must not contain materials known to react unfavourably with a thickened aqueous latex. For example certain pigments, e.g. lead chromes are known to adversely effect latex paints due to their high concentration of soluble metallic ions and unconventional materials like these should be avoided. Other materials which are known to react with poly(vinyl alcohol) or which are likely to adversely interact with the latex/thickener combination, such as boric acid and borate ions may result in obvious incompatibility and gelation of the paint and in thickened aqueous latices which are found to so-react such materials must be excluded from the formulation.

Described broadly, the thickeners to be used according to this invention have the structure of a copolymer of vinyl alcohol with at least one co-monomer addition polymerisable therewith. However, as is well-known, vinyl alcohol does not exist as a stable monomer and the thickeners must be made from suitable copolymerisable monomers by an indirect method.

The polymeric thickener comprises at least one monomer which when copolymerised therein may be subsequently modified to provide a vinyl alcohol unit in the molecule. For example a suitable monomer is an $\alpha,\beta$-ethylenically unsaturated ester which will hydrolyse to provide a vinyl alcohol unit. Suitable monomers of the above type are, for example, hydrolysable esters of vinyl alcohol, e.g. vinyl acetate and vinyl propionate.

The co-monomer of the thickener is selected from certain classes of unsaturated monomers as hereinabove described whereof a homopolymer is essentially insoluble in the aqueous latex. This requirement is met if a homopolymer of the co-monomer polymerised to a molecular weight of not less than 10,000 has a solubility of less than 1% by weight in the continuous phase of the latex to be thickened.

The co-monomer may be an $\alpha$-olefin copolymerisable with the source-monomer, as described above, of the vinyl alcohol units. For example it may be 1-butene, 1-hexene or 1-decene or an aromatic substituted olefin, e.g. styrene, $\alpha$-methyl styrene and the commercial isomers known as "vinyl toluene."

Although less preferred because of the practical difficulties which may arise in preparing copolymers of the desired molar proportions, the co-monomer may be a di-olefin, e.g. 1,3-butadiene, 2-methyl-1,3-butadiene and 2-chloro-1,3-butadiene.

Suitable co-monomers may be selected from alkyl esters of $\alpha,\beta$-ethylenically unsaturated mono- and di-carboxylic acids. For example the co-monomer may be an ester of acrylic, methacrylic, maleic or fumaric acid with a saturated alcohol, e.g. methanol, ethanol, $\beta$-propanol, iso-propanol, n-butanol, iso-butanol, sec-butanol, cyclohexanol, 2-ethyl hexanol and dodecanol. The solubility limitation on the co-monomer will usually, but not necessarily, exclude the use of acid half esters of di-carboxylic acids and of polyhydric alcohols as the ester alcohol.

A further class of co-monomer and one which is particularly preferred because of the ease with which it copolymerises in a wide range of molar ratios with the source-monomer of the vinyl alcohol units, is the group of saturated tertiary acid esters of vinyl alcohol. By saturated tertiary acids we mean monocarboxylic acids of saturated branched-chain hydrocarbons containing a tertiary $\alpha$-carbon atom. The esters may be of single acids or mixed esters derived from one or more acids. For example the ester may be a commercial mixture of esters of tertiary acids containing from 9–11 carbon atoms.

More than one co-monomer may be present in the one thickener molecule and when this is so the number of carbon atoms relating to the above table of copolymer compositions is the arithmetic mean of the number of carbon atoms in the individual co-monomers weighted according to the molar percentage of each co-monomer present in the mixture. When the average number of carbon atoms so-calculated is not a whole number, the required number of moles of co-monomer units is estimated by interpolation from the above table.

The molar concentration of co-monomer in the thickener as defined in the above table is related to both the thickening efficiency of the thickener and its solubility in the latex. For example at lower concentrations of co-monomer than those specified the weight-effectiveness of the thickener declines significantly while at higher concentrations, it may not be soluble in the latex. In general we have found that a molar concentration is reached at and above which it is necessary to incorporate water-soluble organic liquid in the aqueous liquid to maintain solubility of the thickener.

We have found that the solubility of a thickener of the type we describe herein in a particular latex is not solely dependent on the nature of any organic liquid present therein, the solubility being altered, and usually increased, by the inclusion of certain surface-active agents. That is, in the presence of such surface-active agents it may be found that less organic liquid is needed in a particular formulation to maintain the thickener in solution than would be required if these agents were absent.

The thickener is usually made by copolymerisation of source-monomer and co-monomer in the required ratios using conventional free radical initiated addition polymerisation techniques including, for example, the use of chain transfer agents, followed by conversion of the source-monomer units in the polymer to vinyl alcohol units. For example a copolymer of vinyl alcohol and vinyl pivalate may be made by the copolymerisation of vinyl acetate and vinyl pivalate, the vinyl acetate then being hydrolysed under alkaline conditions to provide vinyl alcohol units in the copolymer. When, for a particular chosen copolymer composition, the reactivity ratios of monomer and co-monomer are unfavourable and would require, for example, the use of skew feeding techniques to arrive at the correct copolymer composition, the polymerization is usually more conveniently carried out by aqueous emulsion polymerization.

Thickening of the latex is carried out by adding the thickener, conveniently but not necessarily pre-dissolved in an aqueous liquid, to the latex with stirring, taking the usual precautions familiar in latex manufacture to prevent aeration of the batch. We prefer to limit the thickener concentration to a maximum of 5% by weight of the disperse polymer when films of low water sensitivity are to be prepared from the thickened latex. While dispersions containing as little as 0.1% by weight of thickener, especially when the agent is of high molecular weight, are useful, in general we prefer to use not less than 1% in the latex based on the disperse polymer solids, to provide the most generally useful compositions.

The solubility of the thickening agent in the latex is checked and adjusted, if necessary, by the addition of organic liquid. It is judged to be soluble in the latex if no particles or agglomerates of insoluble thickening agent particles are visible when the thickened latex is examined under a low powered microscope, e.g. ×50 magnifications.

The thickeners disclosed in this invention usually exhibit unusual thickening power when compared with conventional thickeners of similar molecular weight, a property which is most apparent when the un-thickened latex is at least partially anionically stabilised and for the best results we prefer that the latex be so-stabilised. Furthermore, certain combinations of these thickeners with latices have unusual flow characteristics.

When a latex paint is applied to a substrate by, for example, a brush or roller, if the paint is too easily spread dried films of low build result. Hence it is desirable that the paint should also have a low yield value in order that imperfections left in the wet film by the method of application flow out to provide a level surface, before the film dries. That is, the paint should have good levelling characteristics at the chosen plastic viscosity.

By yield value and plastic viscosity we mean the values calculated from the intercept on the abscissa and the slope respectively, of a graph of the shear rate/shear stress curve of the paint plotted on a square root co-ordinate graph. The extrapolation of the graph should be made from the results in the shear rate range at 40 sec.$^{-1}$ to 200 sec.$^{-1}$. This graph is derived from measurements made on a suitable rheometer or viscometer in which the shear stress and its corresponding shear rate may be measured at small increments or continuously over a wide range.

The graph so-obtained, which is sometimes called a Casson plot, is illustrated for example by Asbeck, in the Official Digest of the Federation of Societies for Paint Technology, 33 (1961), at page 69.

Levelling characteristics are conveniently described by the ratio of plastic viscosity in centipoise divided by the yield value in dynes/cm.$^2$. This ratio we will refer to hereinunder as the "flow coefficient." Coating compositions with particularly desirable levelling characteristics are those which have a flow coefficient of greater than 1.5.

We have found that the flow of an aqueous latex is influenced by the addition to it of a thickener, which commonly downgrades its flow characteristics as recognised by a low flow coefficient, typically less than 1; that is the thickened latex shows worse flow than the un-thickened latex. For example, the addition to a commercial acrylic copolymer aqueous latex (particle size approx. 0.1 micron) of 0.4% by weight based on the weight of disperse polymer of a hydroxy ethyl cellulose thickener dropped the flow coefficient from greater than 10 to approximately 0.4.

It is a characteristic of the thickeners of this invention that they usually provide thickened aqueous latices with higher flow coefficients than do conventional thickeners. In particular, when the composition of the thickener is selected for a particular latex in the manner hereinunder described, thickened aqueous latices with flow coefficients of greater than 1.5 may be produced. The latex to be so-thickened is selected from those hereinabove described, but bearing in mind the tendency of thickening to reduce the flow of a latex the un-thickened latex must have a flow coefficient of greater than 3. The determination is made on a sample of un-thickened latex in which all components of the final composition other than the thickener are present.

In this embodiment of the invention we provide a process of preparing a thickened aqueous latex with a flow coefficient of greater than 1.5 by selecting an aqueous latex with a flow coefficient of greater than 3 and comprising disperse polymer particles of average diameter 0.04 to 2.0 micron and stirring into the latex from 0.1 to 10.0% by weight based on the weight of disperse polymer of a soluble polymeric thickener which is selected as hereinunder described from chain-like copolymers of vinyl alcohol as hereinabove defined.

Our observations have shown us that when working with many latices, the addition of substantially any soluble thickener selected from the above composition ranges will produce a thickened aqueous latex of flow coefficient greater than 1.5. However, due, we believe, to interactions one with the other of certain components present in the latex, for example pigments, stabilisers and dispersing agents, this result may not always be achieved. Also, the flow coefficient is notably unpredictible and hence the basis on which the most desirable thickener is to be selected cannot be rigidly defined when, as frequently happens in practice, a commercial latex, the precise composition of which is not known, is to be thickened. There will, however, be a group of thickeners lying within the above composition limits which will enable any particular latex to be thickened according to this embodiment of the invention.

When, therefore, the chosen latex is thickened as described above and the flow coefficient falls below 1.5 we are forced by the existence of these unpredictible factors to narrow our selection of thickener compositions in the following way.

We have found it convenient to select the initial thickener composition close to the minimum permitted co-monomer concentration relative to the number of carbon atoms present in it according to the above table. The latex so-thickened may provide at once the desired flow coefficient. However, if the flow coefficient is below 1.5 a similar thickener but of higher co-monomer molar proportion is selected and a sample of latex thickened with this material re-tested for flow coefficient. The process is repeated, taking into account the permitted variables of choice of co-monomer and the presence of up to 40% by weight in the aqueous liquid of water-soluble or water miscible organic liquid to increase solubility of the thickener until a thickened aqueous latex of the required flow coefficient is obtained. Optionally, the process of selection is repeated with thickeners comprising co-monomers of from 4 to 18 carbon atoms to provide a broad range of thickeners for use with that particular chosen latex. In the most favourable circumstances, all thickeners within the above composition ranges will provide thickened latices having a flow coefficient of greater than 1.5.

We have also observed that as the molecular weight of the thickener increases, it usually becomes more difficult to prepare materials which are both soluble in the aqueous latex and have the desired thickening action. On the other hand, high molecular weight is usually associated with the imparting of a high plastic viscosity to a thickened latex at a given weight concentration of thickener. Hence, while not excluding the use according to the invention of higher molecular weight materials, we prefer in this embodiment of the invention to select thickeners within the weight average molecular weight range of 10,000 to 150,000.

A particularly useful feature of this invention is that once having established for a chosen latex the broad general relationship between thickener composition and resultant flow coefficient of the thickened latex, thickener compositions can then be predicted to meet specific commercial requirements, for example a desired flow coefficient or the most economical thickener composition based on the costs of available co-monomers.

The pH of the latex will have been determined by the selection of un-thickened latex, but most latices exhibit optimum flow within a particular pH range and for the best results we have found it desirable to vary the pH of the thickened latex, for example by the addition of formaldehyde, down to pH of about 7 and to select for use that pH which gives the maximum flow coefficient consistent with stability.

The invention is illustrated by the following examples in which all parts are given by weight:

EXAMPLES 1–3

Preparation of a series of vinyl alcohol copolymer thickeners by aqueous emulsion copolymerisation of vinyl acetate with co-monomers of the invention, followed by drying of the copolymers so-formed, removal of the acetate groups and preparation of their aqueous solutions.

The general method of preparation of the thickeners is as follows, the nature and weights of monomers used in each example being as shown in Table 1.

A solution of 7.7 parts of a commercial surfactant of unspecified composition ("Abex" 18–S, "Abex" being a registered trademark of Unibasic Incorporated) in 38 parts of distilled water was placed in a flask fitted with a reflux condenser, stirrer, thermometer and two dropping funnels. Nitrogen was passed through the flask for 15 minutes to remove most of the oxygen.

One quarter of the total monomer charge as shown in Table 1 was added to the flask and the temperature raised to 50–55° C., when an addition of 0.18 part of potassium persulphate and 0.9 part of a 2% (w./w.) solution of sodium bisulphite was made. The contents of the flask were then raised gradually to reflux. As polymer "seed" formed a gentle reflux was maintained until a temperature of 70° C. was reached. The remainder of the monomer charge and 8.1 parts of a 2% (w./w.) aqueous solution of sodium bisulphite were then added concurrently and slowly at a rate which maintained the reflux temperature at about 65° C. In most cases the addition took about four hours to complete. Heating was continued after the monomer addition was completed to maintain a gentle reflux and ceased when the reflux temperature reached 85° C. The copolymers at this stage were in the form of uniform white latices.

Each latex was then placed on a water bath and heated until the polymer was nearly dry. The polymer was dissolved in 400 parts of methanol and 0.8 part of sodium hydroxide were added. The solution was refluxed for four hours by which time a fine precipitate of polymer had formed.

To this suspension 400 parts of acetone were added to complete the precipitation and flocculation of the polymer, which was recovered by filtration. After drying at room temperature for 16 hours, the polymer was dissolved in water to give a yellow-brown viscous solution. The final solids contents of the solutions are given in Table 1. The solutions prepared as Examples 1–3 will be referred to hereinunder as Thickeners 1–3 respectively.

The thickeners were used to thicken aqueous latices in Examples 5–9.

TABLE 1

| | Monomeric components of vinyl acetate copolymer | | | | Properties of vinyl alcohol copolymers | |
|---|---|---|---|---|---|---|
| Ex. | Type of co-monomer | Parts of co-monomer | Percent moles of co-monomer | Parts of vinyl acetate | Solids content, percent | Thickener number |
| 1 | 1-decene | 1.4 | 1.9 | 43.7 | 11.1 | 1 |
| 2 | Vinyl "Versatic" 10 monomer.* | 0.9 | 0.8 | 44.2 | 17.1 | 2 |
| 3 | 2-ethyl hexyl acrylate. | 0.9 | 0.9 | 44.2 | 17.9 | 3 |

* "Versatic" is a registered trademark of Shell Chemicals, the monomer being a vinyl ester of a 9–11 branched chain tertiary monocarboxylic acid. The thickeners all had weight average molecular weights of the order of 20,000.

EXAMPLE 4

Preparation of a vinyl alcohol-styrene copolymer thickener by aqueous emulsion copolymerisation of vinyl acetate with styrene, followed by drying and hydrolysis of the copolymer so-formed, and preparation of its aqueous solution. The percent molar concentration of styrene in the copolymer is 4.1. The weight average molecular weight is approx. 20,000.

The general method of preparation of this thickener followed the method given in Examples 1–3. The total quantities of monomers used were 42.8 parts of vinyl acetate and 2.3 parts of styrene. After the initial addition of monomers it was noted that polymerisation was not proceeding to the desired extent. Nevertheless the remaining charges of monomer and sodium bisulphite solution were added to the emulsion, and reflux maintained for eight hours. To obtain a satisfactory polymer yield further additions of 0.1 part of potassium persulphate, 4.4 parts of a 2% (w./w.) aqueous solution of sodium bisulphite and 0.06 part of azodiisobutyronitrile were made.

Using the method given in Examples 1–3, the copolymer obtained was dried, refluxed in methanol with sodium hydroxide, precipitated and finally dissolved in water. A cloudy viscous solution was obtained with a solids content of 16.0%. This solution will be referred to hereinunder as Thickener 4.

EXAMPLES 5–10

Preparation of a series of latex paints by the method of the invention and incorporating Thickeners 1–4 from Examples 1–4.

Each paint was prepared from a common mill-base made according to the following formula:

A mixture of:

| | Parts |
|---|---|
| Pigment grade r-titania | 10.0 |
| Commercial defoamer ("Nopco" NXZ, "Nopco" being a registered trademark of Nopco Chemical Co.) | 0.08 |
| 25% (w./w.) aqueous solution of sodium hexametaphosphate | 0.24 |
| Water | 2.7 | was ground for 16 hours in a laboratory ball mill.

The mill-base so-prepared was added with stirring to 26.0 parts of the latex under test. The latices used were commercial acrylic copolymer latices and are identified in Table 3 as follows:

Latex A

Solids 46.5% by weight, average particle diameter 0.1 micron.

Latex B

Solids, 47.0% by weight, average particle diameter 0.2 micron.

Thickeners according to Table 2 were added to the above mixtures with stirring, the thickeners being warmed if necessary to increase their fluidity for ease of handling.

To achieve preferred brushing rheologies further adjustments to some of the paints were made. The viscosity of the paints prepared in Examples 5, 6, 7, 8 and 10 were adjusted by the addition of the quantities of water indicated in Table 2. The pH of each paint in Examples 6, 8 and 10 was adjusted to the values given in Table 2 using a 20% aqueous solution of formaldehyde. In all cases, the un-thickened pigmented latices had flow Coefficient of greater than 3.

The rheology of each of the paints of Examples 5–10 was measured at 25% C. on an "Epprecht" Rheomat "15" using the "B" cup. The plastic viscosities and Flow Coefficients, as hereinabove defined were determined and are recorded in Table 2. The Flow Coefficients are all above 2 indicating that the paints have good flow. This was confirmed when the paints were brushed onto glass panels, with the brush marks flowing out to a degree uncomon in conventional latex paints.

The gloss of each of the dried films so-prepared was measured at an angle of 60° C. according to A.S.T.M. Specification D–523. The films were allowed to dry for at least 16 hours before gloss measurements were made. The results are given in Table 2, from which it will be seen that the paints all produced films of a satin or semi-gloss nature.

TABLE 2

| Ex. | Thickener soln. used from Examples 1–4) | Latex used | Preparation of paint | | Properties of paint | | |
|---|---|---|---|---|---|---|---|
| | | | Parts added thickener soln. | Additional adjustments | Plastic visc., poise (25° C.) | Flow coeff. | Gloss, 60° angle |
| 5 | 1 | A* | 3.9 | Added 9.0 parts water. | 1.8 | 5.2 | 65 |
| 6 | 1 | B | 3.9 | Added 1.7 parts water pH to 7.6. | 1.8 | 4.4 | 66 |
| 7 | 2 | A* | 2.5 | Added 6.5 parts water. | 1.6 | 3.3 | 62 |
| 8 | 2 | B | 2.5 | Added 1.3 parts water pH to 7.5. | 2.1 | 2.7 | 66 |
| 9 | 3 | A | 2.3 | | 0.61 | 3.1 | 67 |
| 10 | 4 | A | 3.9 | Added 1.0 parts water pH to 7.3. | 0.65 | 2.3 | 74 |

*Plasticised with 2½% (w./w.) of tri-n-butyl phosphate.

EXAMPLE 11

Preparation of a poly(vinyl alcohol/vinyl "versatic" 10) copolymer thickener by aqueous emulsion copolymerisation of the monomers, followed by drying and hydrolysis of the copolymer so-formed, and preparation of its aqueous solution.

The general method of prepartion of this thickener followed the method given in Examples 1–3. The total quantities of monomers used were 45.0 parts of vinyl acetate and 5.3 parts of vinyl "versatic" 10 monomer.

Using the method given in Examples 1–3, the copolymer obtained was dried, refluxed in methanol with sodium hydroxyide, precipitated and finally dissolved in water. A viscous solution was obtained with a solids content of 22.3%. This solution will be referred to hereinunder as Thickener 5. The moles of vinyl "versatic" 10 monomer units expresed as a percentage of the total monomer units was estimated from the proportions of the monomers used in the preparation to be 0.5%. The weight average molecular weight of the copolymer was estimated from the viscosity of a 4% aqueous solution to be about 20,000.

EXAMPLE 12

Preparation of a latex paint incorporating Thickener 5 fror Example 11.

The general method of preparation of this paint followed the method given in Examples 5–10. After grinding a mill-base of the composition given in Examples 5–10, 26.0 parts of Latex A plasticised with 2½% (w./w.) of tri-n-butyl phosphate were added. The Flow Coefficient of the pigmented un-thickened latex so-formed was greater than 3. To this mixture was added 4.0 parts of Thickener 5 from Example 11 and 5.0 parts of water. The thickener was warmed prior to the addition to increase its fluidity.

The rheology of the paint was measured at 25° C. on an "Epprecht" Rheomat "15" using the "B" cup. The plastic viscosity and Flow Coefficient as hereinabove defined were 1.6 poise and 1.8, respectively.

The Flow Coefficient, being below 2 indicates that the paint has only fair flow. This was confirmed when the paint was brushed onto a glass panel, with the brush marks not flowing out to the desired degree.

A paint having a Flow Coefficient of greater than 2 was then prepared by the process of the invention by selecting a different thickener within the specified composition limits. Thus it was found that by increasing the moles of vinyl "versatic" 10 monomer units expressed as a percentage of the total monomer units in the copolymer to 0.8, and then repeating the thickening process with a fresh sample of unthickened latex, a thickened latex with a plastic viscosity of 1.6 poise and a Flow Coefficient of 3.3 was formed.

We claim:

1. In a thickened aqueous latex comprising an aqueous latex containing from 20 to 60% by weight of disperse particles of insoluble polymer having an average diameter of 0.04 to 2.0 micron and as a thickener from 0.1% to 5.0% by weight based on the weight of disperse polymer particles of a polymer of vinyl alcohol soluble in the aqueous latex the improvement wherein the polymer of vinyl alcohol is selected to be a chain-like copolymer of vinyl alcohol with at least one co-monomer containing 4 to 18 carbon atoms and selected from the group consisting of olefins, aromatic substituted olefins, unsubstituted alkyl esters of $\alpha,\beta$-ethylenically unsaturated mono- and dicarboxylic acids and saturated tertiary acid esters of vinyl alcohol whereof a homopolymer is essentially insoluble in the aqueous latex, the copolymer having a weight average molecular weight of 10,000 to 300,000 and the proportion of co-monomer units therein being related to the number of carbon atoms in the co-monomer according to the following table:

| C atoms in co-monomer | Moles of co-monomer units as a percentage of total monomer units | |
|---|---|---|
| | Minimum | Maximum |
| 4 | 10.0 | 50 |
| 5 | 6.0 | 30 |
| 6 | 3.0 | 20 |
| 7 | 1.5 | 16 |
| 8 | 1.0 | 13 |
| 9 | 0.8 | 11 |
| 11 | 0.7 | 10 |
| 11 | 0.6 | 9 |
| 12 | 0.5 | 8 |
| 13–18 | 0.2 | 6 | the thickened aqueous latex having a Flow Coefficient of greater than 1.5.

2. A thickened aqueous latex according to claim 1 in which the disperse polymer particles have an average diameter of from 0.1 to 0.6 micron.

3. A thickened aqueous latex according to claim 1 in which weight concentration of polymeric thickener is 1.0 to 5.0% of the weight of disperse polymer.

4. A thickened aqueous latex according to claim 1 in which the proportion of co-monomer units of the copolymer is related to the number of carbon atoms in the co-monomer according to the following table:

C atoms in co-monomer:

| | Moles of co-monomer units as a percentage of total monomer units |
|---|---|
| 4 | 15–30 |
| 5 | 8–20 |
| 6 | 5–10 |
| 7 | 2–8 |
| 8 | 1.5–7 |
| 9 | 1.2–6 |
| 10 | 1.0–5 |
| 11 | 0.9–4 |
| 12 | 0.8–4 |
| 13–18 | 0.3–3 |

5. A thickened aqueous latex according to claim 1 in which the total concentration of surface active agents is a maximum of 4% by weight of the un-thickened latex.

6. A process of preparing a thickened aqueous latex with a Flow Coefficient of greater than 1.5 by selecting an aqueous latex with a Flow Coefficient of greater than 3 and comprising disperse polymer particles of average diameter 0.04 to 2.0 micron and stirring into the latex from 0.1 to 10.0% by weight based on the weight of disperse polymer of a soluble polymeric thickener which is selected as hereinabove described from chain-like copolymers of vinyl alcohol according to claim 1.

7. A process according to claim 6 in which the polymeric thickener has a weight average molecular weight of 10,000 to 150,000.

References Cited
UNITED STATES PATENTS

| | | | |
|---|---|---|---|
| 3,083,172 | 3/1963 | Scott et al. | 260—29.6 |
| 3,208,963 | 9/1965 | Jasinski | 260—29.6 |
| 3,203,918 | 8/1965 | Goldberg et al. | 260—29.6 |

OTHER REFERENCES

The Condensed Chemical Dictionary, copyright 1950, page 768 relied on.

Martens, Charles: Emulsions and Water-Soluble Paints and Coatings, 1964, pages 58–65 relied on.

JULIUS FROME, Primary Examiner

L. GARRETT, Assistant Examiner